United States Patent [19]

Mierzwinski

[11] 4,111,421
[45] Sep. 5, 1978

[54] OPTICAL LINKED REMOTE CONTROL VIDEO GAME APPARATUS

[75] Inventor: Eugene P. Mierzwinski, Fort Wayne, Ind.

[73] Assignee: The Magnavox Company, Fort Wayne, Ind.

[21] Appl. No.: 749,147

[22] Filed: Dec. 9, 1976

[51] Int. Cl.² .................. A63F 7/06; F41J 5/08; G08B 5/22
[52] U.S. Cl. .................. 273/85 G; 273/101.1; 273/DIG. 28; 340/324 AD
[58] Field of Search ............ 273/1 E, 85, 85 R, 101.1, 273/101.2, 102.2 B, DIG. 28; 340/168, 168 B, 171, 171 R, 225, 228, 324 R, 324 A, 324 AD, 258 B, 324, 258; 358/93, 113, 226, 142; 325/392; 35/25

[56] References Cited

U.S. PATENT DOCUMENTS

| | | |
|---|---|---|
| 3,432,846 | 3/1969 | Jones et al. .................. 340/324 R X |
| 3,829,095 | 8/1974 | Baer .................. 273/101.1 |
| 3,838,856 | 10/1974 | Takeya et al. .................. 273/101.1 |
| 3,847,396 | 11/1974 | Ashford .................. 273/101.1 |
| 3,874,669 | 4/1975 | Ariano et al. .................. 273/DIG. 28 |
| 3,918,714 | 11/1975 | Ceccaroni .................. 273/101.1 |
| 4,026,555 | 5/1977 | Kirschner et al. .................. 273/102.2 B X |
| 4,034,990 | 7/1977 | Baer .................. 273/85 R |

*Primary Examiner*—Vance Y. Hum
*Attorney, Agent, or Firm*—George R. Pettit

[57] ABSTRACT

Apparatus is provided for playing a video game from a location remote from a television receiver or other CRT display apparatus. Other devices are provided for generating position indicating signals for game markers and transmitting said signals to remotely located video game circuitry by means of an optical link. The remotely located game circuitry cause markers to be displayed on the CRT display in accordance with said position indicating signals.

6 Claims, 3 Drawing Figures

OPTICAL LINKED REMOTE CONTROL VIDEO GAME APPARATUS

BACKGROUND OF THE INVENTION

This invention relates to the video game art and the remote control art. Specifically, apparatus is provided for playing a video game remotely from a television receiver over an optical light link.

Video game apparatus for playing a game on a television receiver or a CRT display have become well known. The apparatus used for generating signals for indicating the position of player markers is described more particularly in U.S. Pat. Nos. Re. 28,507 and Re. 28,598. These apparatus use a cable for connecting the source of video signals representing game markers to the antenna terminals of a television receiver. Recently, interest has been expressed in a video game circuit which introduces game marker signals directly to the video circuitry of a television receiver or CRT display. This avoids the generation of r.f. signals which may interfere directly with the television receiver or other communications equipment.

Remote controlled video games are desirable in order to eliminate the cable which connects the game circuitry to the television receiver. This cable may present problems in convenience to the operators and is a potential source of radiated signals which may interfere with other communications equipment. Therefore, to avoid the possibility of unwanted radiation, it is desirable to use an optical link which will transmit commands from the player participants to video game circuitry located at the television receiver. The optical signals would not interfere with most communications equipment found within the average home.

The use of infrared light energy as the medium for carrying game commands is attractive because of this non-interference and it removes the inconvenience of a cable having to be connected and disconnected to the television receiver. The apparatus of this invention may be used to generate signals which transmit commands to game circuitry at the television receiver, avoiding generation of any signals having a frequency in the passband of the television receiver. Both introduction of a game marker signal into the television receiver antenna terminals, or directly inserting a game marker signal into the video portion of the television receiver is provided.

SUMMARY OF THE INVENTION

It is therefore an object of this invention to play a video game from a location remote from a television receiver.

It is a further object of this invention to provide a remote control video game which does not generate signals which interfere with other communication signals.

These and other objects of the invention are accomplished by remotely controlling a video game by means of an optical link. Apparatus is provided for selecting the position of game markers on a television CRT display, and transmitting coded commands via an infrared link to game circuitry located at the television receiver. The game circuitry at the television receiver decodes the commands and supplies signals which alter the position of game markers appearing on the television receiver screen.

The invention is described with reference to two separate embodiments which allow the control of a plurality of game markers from a distant location. Although each preferred embodiment describes the control of two such game markers, those skilled in the art will recognize that additional game markers may be controlled using the principles of this invention.

These figures are illustrative only of means for accomplishing the invention described in the claims.

DESCRIPTION OF THE PREFERRED EMBODIMENT

Figure 1:
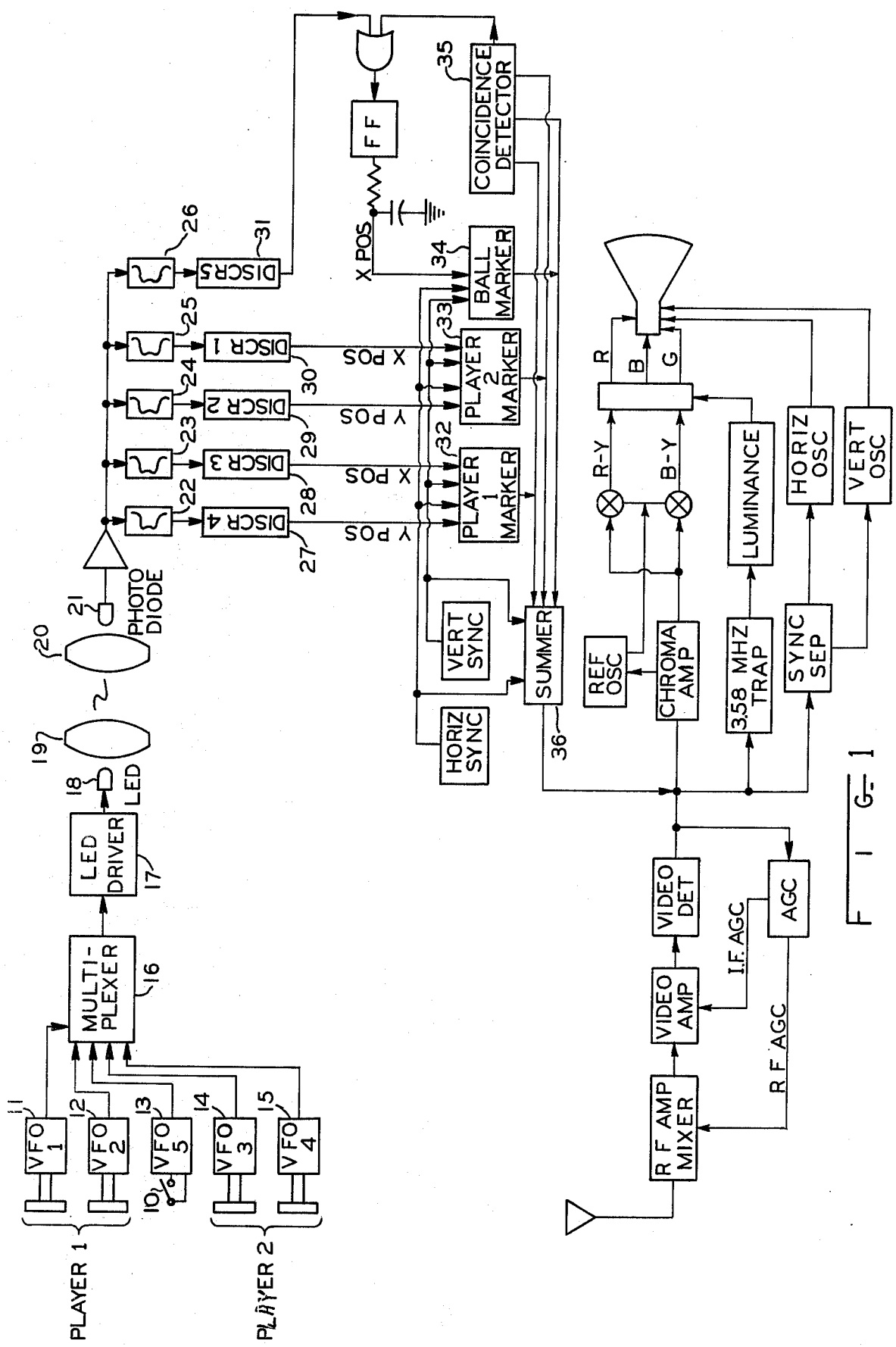
FIG. 1 is a schematic drawing of one means for transmitting and receiving marker indicating data for video game apparatus.

Referring now to FIG. 1, there is shown an overall block diagram of apparatus used to play a video game from a remote location by means of an infrared light link. A transmitter is shown comprising a plurality of variable frequency oscillators 11–15 (hereinafter referred to as "vfo"), a multiplexer 16, a light emitting diode driver circuit 17, and a light emitting diode 18 arranged in front of a lens 19. Each variable frequency oscillator is capable of generating a separate band of frequencies. Each vfo has a frequency which may be varied by operating mechanical controls associated with each vfo. Changes in frequency constitute position indicating data for video game circuitry located at the other end of the infrared link.

Each vfo has a center frequency of $f1, f2, f3, f4$, and $f5$. The frequency of each vfo will be caused to deviate from its center frequency by manipulating the mechanical control means operatively connected to each vfo. Vfo 5 having a center frequency of $f5$ is connected to a momentary switch 10. The operation of the momentary switch 10 will generate a signal having a frequency of $f5$ which is used to initiate the serve of a ball in a simulated tennis or Ping Pong game. A reset function is currently required for video game apparatus which simulate the aforementioned games. Momentary operation of the switch 10 connected to vfo 5 produces a momentary burst of signal, and the control flip flop associated with the marker generator for generating video signals representing the simulated ball will be reset. Those skilled in the video game art will recognize the importance and necessity of this particular function.

Multiplexer 16 performs a summing process whereby all the outputs from the respective variable frequency oscillators are summed to form a composite signal. Composite signals delivered by multiplexer 16 drive a light emitting diode 18 through an amplifier circuit 17. The LED amplifier circuit 17 pulses the LED 18 according to the composite signal delivered by the multiplexer 16. The LED 18 converts this composite signal into infrared energy bursts. The infrared energy is then gathered by lens 19 for transmitting to a distant receiver. Lens 19 may be eliminated where the distance between transmitter and receiver is such that a path loss sustained by the infrared light energy is not substantial.

Thus there has been described with respect to one transmitting apparatus a means for generating an infrared light signal containing position data for the game objects of a video game located remotely from the user.

A receiver for receiving and decoding position indicating data contained within an infrared light signal is also shown in FIG. 1 and will be described in detail. Infrared light energy is received by a lens 20 which images the transmitted light to a photo diode 21. Photo diode 21 is a transducer for converting the light energy to electrical impulses for further processing. The output signal from photo diode 21 varies according to the composite vfo signal delivered by multiplexer 16 in the aforementioned transmitter circuit. This composite vfo signal is applied to a plurality of bandpass filters 22-26, each bandpass filter having a center frequency corresponding to one of the vfo center frequencies in the aforementioned transmitter. The bandpass filter is wide enough to accommodate the variations in vfo frequency which occur when an operator manipulates the mechanical controls which engage a vfo circuit. Therefore, the outputs of each bandpass filter represent the signals produced by each vfo circuit in the aforementioned transmitter.

The respective outputs of bandpass filters 22-26 are supplied to discriminator circuits 27 through 31 for demodulation into a dc control voltage. The discriminators have a center frequency corresponding to the respective center frequencies of the bandpass filters which terminate the input of each discriminator. Therefore, a dc voltage is supplied by each discriminator in response to an input signal proportional to the frequency deviation of signals supplied by each bandpass filter. This will be recognized to be proportional to the frequency deviation which results when the manual controls associated with each vfo circuit of the transmitter are manipulated. Therefore, the outputs from each discriminator provide a varying dc voltage proportional to the mechanical motion imparted to each of the controls engaging each of the vfo circuits in the transmitter.

The output voltages from discriminators 27-30 are used to position player markers on a video game which simulates tennis or Ping-Pong. Player marker generators 32, 33 for generating video signals representing the location of player positions in a simulated video game are well known in the art. These marker generators are described more completely in U.S. Pat. Nos. Re. 28,507 and Re. 28,598 hereby incorporated by reference. The position of each marker represented by signals from the player marker generators 32, 33 is dependent upon the dc voltage supplied to two position inputs. Therefore, video signals representing the position of player markers may be controlled by manipulating the frequency of the vfo in the aforementioned transmitter circuit.

Also shown in the figure is a ball marker generator 34 for generating a video signal indicative of the position of a simulated ball being played by game participants. The ball marker video signal is summed with the player marker video signals generated by player marker generators 32, 33 in summer 36. The ball marker horizontal position is controlled by a flip flop 37 connected to a coincidence detector 35. The coincidence detector 35 and ball marker generator 34 are also described in detail in the aforementioned U.S. patents. This circuitry is video game apparatus now available from semiconductor manufacturers as well as others.

Also shown in the figure is a discriminator 31 and a filter 26 having center frequencies corresponding to the center frequency of vfo 5. When momentary burst of signal from vfo 5 is supplied by actuating a switch 10 at the transmitter, the discriminator 31 will provide an output pulse. This pulse may be used to reset flip flop 37 in most video games which re-serves the ball marker in a simulated tennis or Ping Pong game. The reset function is necessary to all simulated tennis and Ping Pong games.

The output of the summer 36 may be applied directly to the video circuits in a conventional television receiver or monitor. This, however, is entirely optional and those skilled in the art will recognize that a modulator may be used in connection with summer 36 to supply a modulated signal to the antenna terminals of a conventional television receiver. The signal may then enter the television receiver and be demodulated as an ordinary television signal. The aforementioned references disclose this method of supplying game signals to a television receiver.

The video signal entering the television receiver is demodulated in conventional fashion and player markers and ball markers are simulated on the television receiver screen.

Thus there is described one means for controlling a video game via an infrared link.

The apparatus previously described illustrates one means for generating and detecting from a remote location position commands establishing game marker positions in a video game. Other apparatus which may be used are shown in FIG. 2 and FIG. 3.

Figure 2:
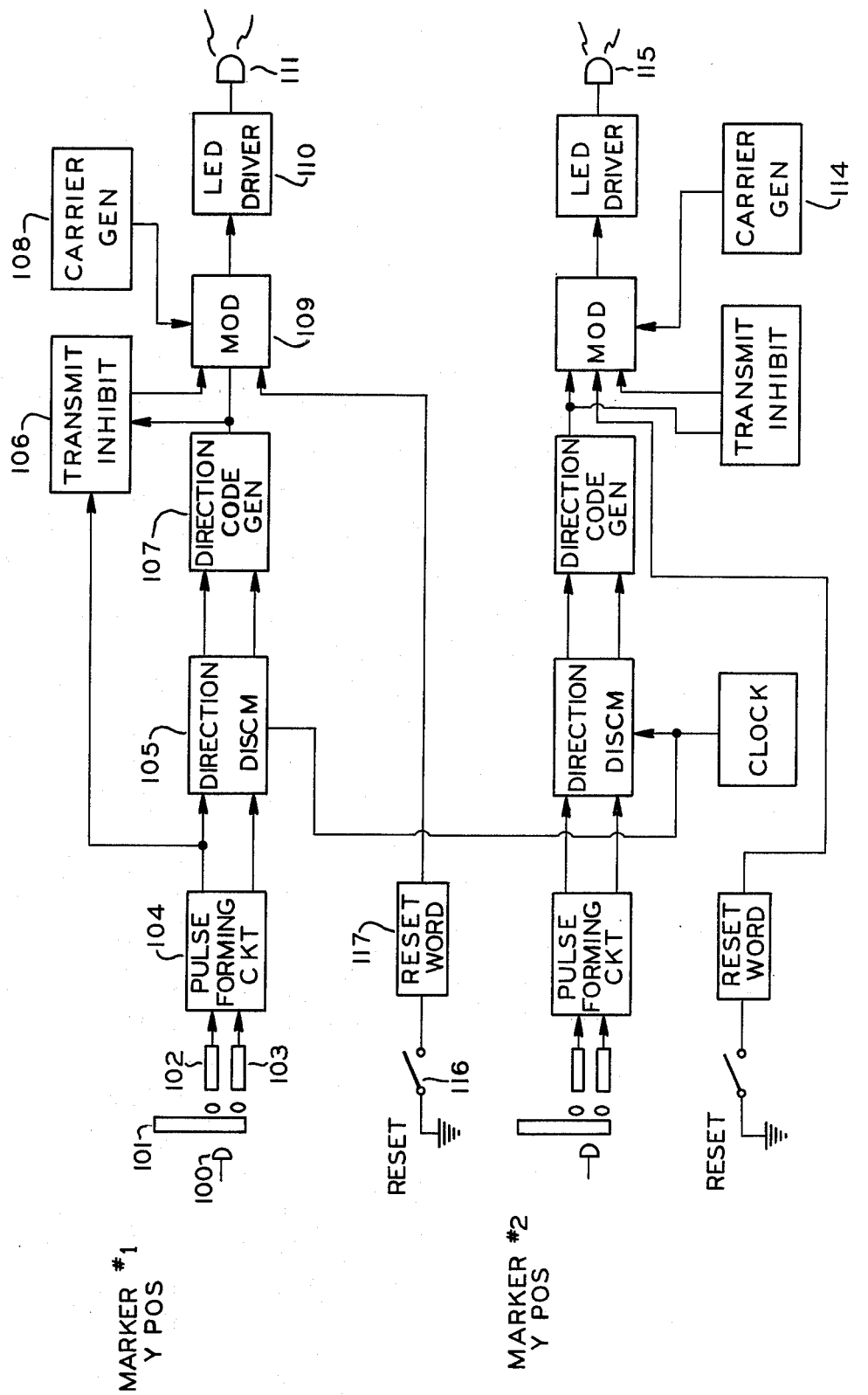
FIG. 2 shows another embodiment of a transmitter for transmitting signals indicating game marker positions to video game apparatus.
Figure 3:
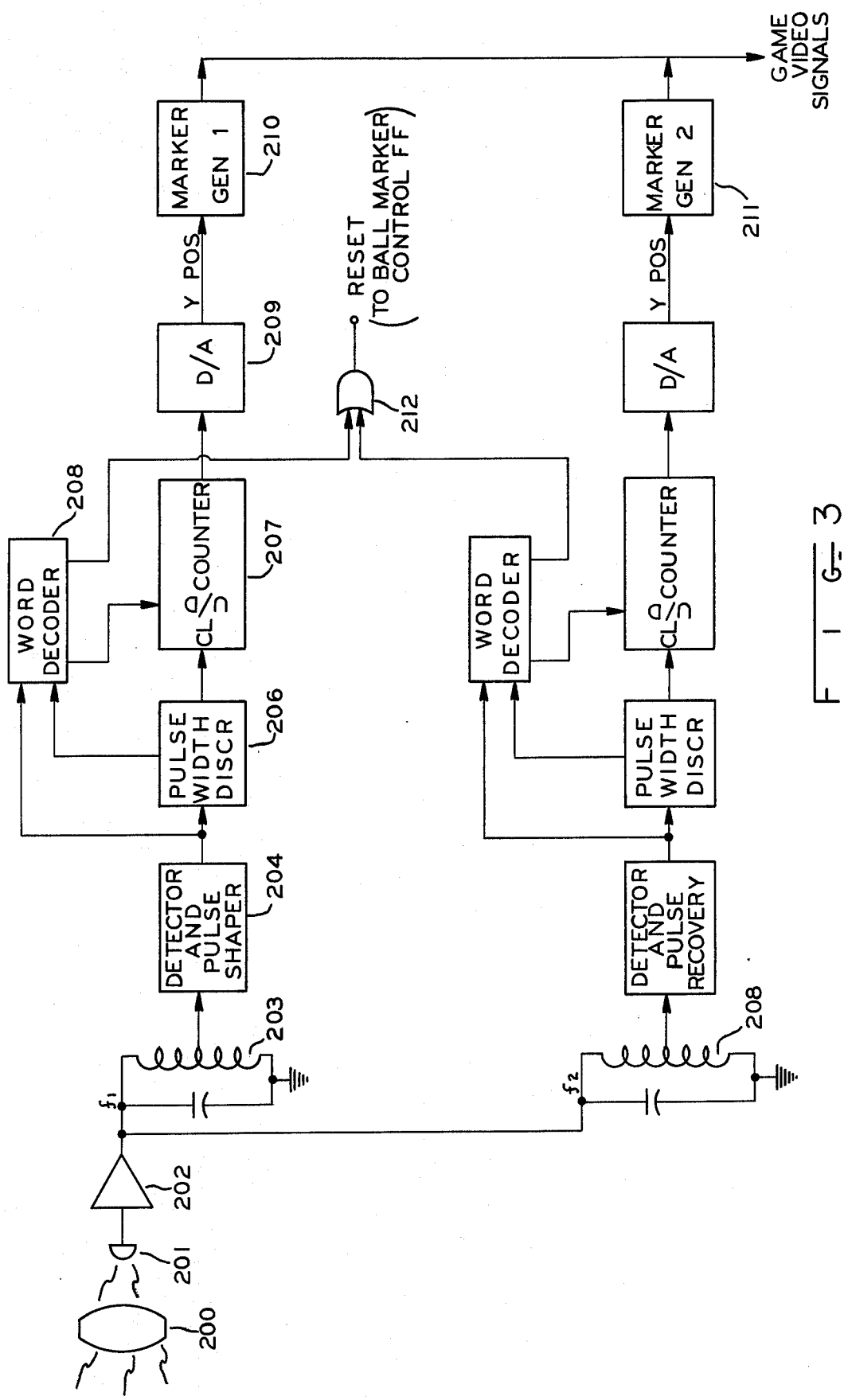
FIG. 3 is a schematic drawing of apparatus for receiving commands generated by the transmitter of FIG. 1 and controlling video game apparatus with said received commands.

Referring now to FIG. 2, there is shown generally an arrangement for transmitting commands by means of infrared light from a remote location. The commands are in the form of coded bursts of infrared light energy. The coded bursts represent the digits of a multi digit binary number which may be detected to produce position information for game markers of a video game. Circuitry for realizing the apparatus described in FIG. 2 is shown more completely in a copending patent application filed by Eugene P. Mierzwinski and David W. Worley, Ser. No. 671,205, filed Mar. 29, 1976, now U.S. Pat. No. 4,045,777 and assigned to The Magnavox Company. The referenced copending patent application described circuitry for generating commands to a remotely located television receiver which accomplishes the normal tuning and adjustment procedures to television receivers. The following description is only one example of another apparatus for transmitting codes which may control the operation of video games.

Position information is generated by means of an optically coded wheel 101 illuminated by a source of light 100 such as a light emitting diode. On the other side of the optically coded wheel is located two light receivers such as photo diodes 102, 103. The optically coded wheel 101 contains two concentric tracks each having plurality of alternately spaced transparent and opaque regions. Light passing through the transparent regions causes the photo detectors 102 and 103 to produce electrical signals. As the code wheel 101 is rotated, each of the photo detectors 102 and 103 produce pulses. By properly locating the position of photo detectors 102 and 103 with respect to the concentric tracks on code wheel 101, the output between photo detectors 102 and 103 will be phase displaced by 90°. Such structures are well known in the optical shaft encoding art.

The pulses supplied by photo detector 102 and photo detector 103 are applied to pulse forming circuitry 104 where they are "squared up". The output from the pulse forming circuit is supplied to a direction discriminator circuit 105. Direction discriminator 105 has two outputs one representing when the code wheel is being rotated in a clockwise direction, and one representing the condition where the code wheel 101 is rotated in a counter clockwise direction. Each of these outputs is applied to a direction code generator 107. Direction code generator 107 generates a serial multi bit binary word which represents the direction in which the code wheel 101 is being rotated. Each code has a beginning identifying pulse which is wider than other pulses produced by rotating the code wheel. The binary word is used to amplitude modulate a carrier of approximately 40 kilocycles. This carrier of 40 kilocycles is supplied by carrier generator 108. The modulated composite output is supplied from modulator 109 to a light emitting diode driver 110. Diode driver 110 is a current amplifier which pulses light emitting diode 111 according to the format of the serial binary word produced by direction code generator 107. Light emitting diode 111 emits substantially infrared radiation, and such diodes are available from commercial semiconductor manufacturers.

Once a coded word indicating the direction of the rotation of wheel 101 is generated, pulses from pulse forming circuit 104 are directly applied to modulator 109 through inhibit circuitry 106. Inhibit circuitry 106 merely keeps the pulses generated by pulse forming circuit 104 from being applied to the modulator when a direction code is being transmitted. However, once the transmission of a direction code is completed, transmit inhibit means 106 will apply pulses from pulse forming circuit 104 directly to modulator 109.

As the wheel 101 is rotated, the pulses are transmitted via the modulator 109, carrier generator 108, and LED driver 110 to a light emitting diode 111 and bursts of infrared light energy are formed in a binary coded format. At the receiver, each burst of infrared light energy represents a pulse for incrementing or decrementing a counter, depending upon which code word was last generated by direction code generator 107. The receiver having received a direction code word is enabled so that a counter will either count up or down. The output of the counter in the receiver may thereafter be converted into a dc voltage level for applying to the marker generator of a respective game marker generator in a video game.

The previous description of FIG. 2 included a description of only one game marker which is remotely controlled in one axis only. A second game marker control in one axis only is also shown in FIG. 2. The circuitry for both game marker controls is identical except for the frequency of operation of carrier generators 114 and 108. Carrier generator 114 is operated at a frequency different from carrier generator 108 to prevent interference between infrared light produced by the respective light emitting diodes 111, 115.

Also shown in the figure are reset switches 116 and 117. These switches are used to transmit a binary word which resets the ball marker flip flop in the video game. A reset word generator supplies the reset word to the respective modulator. The leading pulse of the reset word is also wider than the incrementing pulses thereby distinguishing this reset word over the incrementing pulses.

A receiver for detecting a coded format of infrared light energy is also described more specifically in the referenced copending application. The overall configuration for this receiver is shown in FIG. 3. Referring now to FIG. 3, optical energy incident on the receiver is imaged by a lens 200 on a photo detector 201. Photo detector 201 produces an electrical signal in response to a burst of infrared energy which is received. An amplifier 202 amplifies this signal and applies it to preselection circuitry 203 and 208. Preselection circuitry 203 and 208 consists of tuned circuits tuned to the respective carrier frequencies of the carrier generators of FIG. 2. By using preselection circuitry the energy transmitted by light emitting diodes 111 and 115 of FIG. 2 may be separated for decoding and detection.

The output of the preselection circuit 203 is supplied to a detector and pulse shaper 204. This circuit effectively removes the 40 kilocycle carrier frequency transmitted leaving the pulse code information. The pulse code information recovered comprises either a direction code word or incrementing pulses. The direction code word is used to indicate whether the code wheel is being rotated in a clockwise or counter clockwise direction. The incrementing pulses are produced by rotation of the code wheel and is used to indicate a change in marker position.

These pulse codes are supplied to a pulse width discriminator 206. As previously mentioned, the direction code word begins with a pulse having a width greater than the width of other pulses transmitted. The detection of this greater width pulse disables a counter 207 and simultaneously enables a word detector circuit which receives the direction code word being presently transmitted. This circuit provides an output depending upon whether the word received is an indication of a clockwise movement or a counter clockwise movement of the direction code wheel. The copending patent application describes in detail circuitry of this nature. Those skilled in the art will recognize that many circuits are available for receiving a serial binary word and providing an indication of the actual word detected. One such means would include generating a parallel binary word and inserting the binary word in a presettable counter having parallel inputs. By decoding the outputs of the counter, an indication of which of two words is being received may be derived.

The reset words transmitted by the transmitter of FIG. 2 are received similarly to the direction code words. The word detector may store this word in a similar manner and supply an indicator to an OR gate 212. OR gate 212 is used to provide an indication for resetting the ball marker control flip flop in video game apparatus. This effectively re-serves the ball marker.

When the direction code word has been received, the pulse width discriminator 206 will disable the word detector 208. The word detector 208 thereafter provides the indication of which direction the code wheel is being rotated to an up/down counter 207. The up/down mode is thereby selected depending upon which direction code word has been received. Simultaneously, the counter 207 is enabled to receive incrementing pulses supplied by detector and pulse shaper circuit 204. These incrementing pulses will occur after the direction code word has been transmitted. By counting the incrementing pulses, a change in position of the code wheel at the transmitter is indicated. By converting the counter output digits to a dc voltage by means of a digital to analog converter 209, a dc voltage is provided which varies as the counter contents change. Since the direction of count of counter 207 is controlled by the direction code word received, the analog voltage will increase or decrease according to the change in the code wheel direction of rotation.

The output of the digital to analog converter 209 is used to control the marker generator video in a manner well known in the video game art. By varying the dc voltage supplied to a marker generator 210, the position in one axis of a game marker may be changed. This change in position will correspond with the change in position of the code wheel located at the remote control transmitter.

Identical circuitry is provided in FIG. 3 for decoding commands to a second marker generator 211. Preselection circuitry 208 separates the second marker commands generated at the transmitter circuit from the first marker commands. After preselection occurs, the signal is processed in an identical manner for marker generator 211. The video signals of the respective marker generators are summed as in a conventional video game and applied to remaining video game circuitry.

Thus there has been described with respect to separate embodiments a means for playing a video game over an optical link. Those skilled in the art will recognize numerous other embodiments of the invention described more particularly by the claims that follow.

What is claimed is:

1. Remote control apparatus for playing a video game, said video game of the type having means for generating signals representing a plurality of game markers displayable on a CRT display means, said remote control apparatus comprising:
   (a) a plurality of manually operable control means for selecting a plurality of desired game marker positions;
   (b) means for generating a position indicating electrical signal in response to said plurality of manually operable control means, said signal indicating the selected positions for said game markers;
   (c) a source of infrared light energy;
   (d) means for modulating said source of infrared light energy with said position indicating electrical signal whereby a modulated light beam is produced;
   (e) means for detecting said modulated light beam, said means providing a second electrical signal in response to the modulation of said light beam;
   (f) means for demodulating said electrical signal to produce a plurality of actuating signals, said actuating signals being indicative of said selected marker positions; and
   (g) means for applying said plurality of actuating signals to said means for generating signals representing game markers whereby said game marker positions are controlled in accordance with said plurality of manually operable control means.

2. Remote control apparatus for operating a video game, said video game having means for generating player positionable game playing markers for display on a CRT display, comprising:
   (a) first manual control means for selecting a position for a first game marker;
   (b) second manual control means for selecting a position for a second game marker;
   (c) a first variable frequency oscillator operatively connected to said first manual control means, said first variable frequency oscillator having a frequency responsive to said manual control means;
   (d) a second variable frequency oscillator operatively connected to said second manual control means, said second variable frequency oscillator having a frequency responsive to said second manual control means;
   (e) means for summing said first and second variable frequency oscillator output signals to form a composite signal;
   (f) a source of infrared light;
   (g) means for modulating said source of infrared light with said composite signal;
   (h) means for receiving modulated light produced by said infrared light source;
   (i) means for converting received modulated infrared light into an electrical signal; and
   (j) a plurality of discriminators for receiving said electrical signal and producing a plurality of actuating signals for controlling the position of said plurality of game markers.

3. A remote controlled video game for generating a plurality of player positionable game markers on a CRT comprising means for selecting the positions of a plurality of game markers, means for generating a signal representing the selected positions of said game markers, a source of infrared light, means for modulating said source of infrared light with said signal, means for demodulating said modulated infrared light into a plurality of d.c. voltages, and a plurality of game marker generators for causing game markers to be displayed on a CRT display, said game markers' position being controlled by said plurality of d.c. voltages.

4. The apparatus of claim 3 further comprising means for reserving an out of bounds game marker from a remote location.

5. An apparatus for transmitting and receiving position indicating commands to a remotely located video game apparatus comprising:
   (a) a rotatable optically coded wheel,
   (b) means for generating a direction signal for indicating the direction of rotation of said wheel;
   (c) means for generating incrementing pulses in response to the angular displacement of said wheel;
   (d) means for modulating a beam of infrared light with said direction signal and said incrementing pulses;
   (e) means for detecting said beam of modulated light and providing an electrical current in response to said modulation;
   (f) means for detecting the presence of said direction signal in said electrical signal;
   (g) means for counting incrementing pulses contained in said electrical signal, the direction of count being controlled by said means for detecting the presence of said direction signal; and
   (h) means for controlling the position of game marker produced by said video game in response to said means for counting whereby said game marker position is controlled by the angular displacement of said wheel.

6. Remote control apparatus for controlling the position of a game marker in a video game apparatus, said video game apparatus comprising means for generating game playing markers and means for displaying said game playing markers, comprising:
   (a) means for generating a series of pulses in response to the movement of an operable control;
   (b) means for generating a binary word for indicating the direction of movement of said control;
   (c) means for generating a source of light energy;
   (d) means for modulating said source of light energy with said series of pulses and said binary word;

(e) means for demodulating at a remote location light energy which is modulated with said series of pulses and said binary word;
(f) means for decoding said binary word produced by said means for demodulating;
(g) counter means having an up/down control input and a clock input; said up/down control input being operatively connected to said means for decoding, said clock input being operatively connected to said means for demodulating for receiving said series of pulses; and
(h) means for decoding said counter means to produce a voltage proportional to the number in said counter, said voltage being operatively applied to said means for generating a game playing marker whereby a game playing marker is positioned according to said voltage.

* * * * *